Sept. 3, 1940.　　　A. R. CHOPPIN ET AL　　　2,213,623
COOKING APPARATUS
Original Filed June 7, 1939　　　3 Sheets-Sheet 1
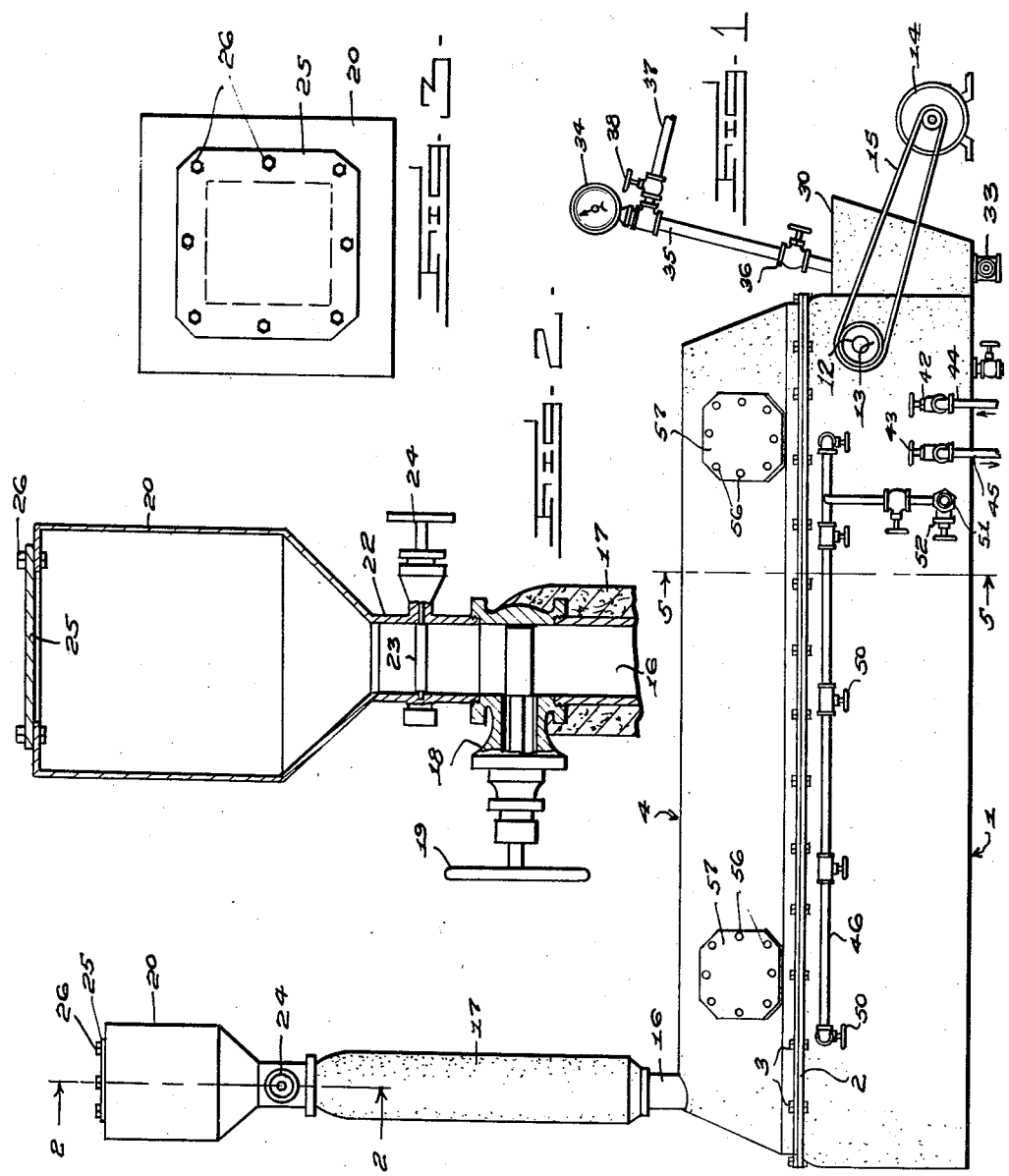
Inventors
ARTHUR R. CHOPPIN,
ELEANOR L. WINBORN,
By Clarence A. O'Brien
and Hyman Berman
Attorneys Sept. 3, 1940.  A. R. CHOPPIN ET AL  2,213,623
COOKING APPARATUS
Original Filed June 7, 1939  3 Sheets-Sheet 2
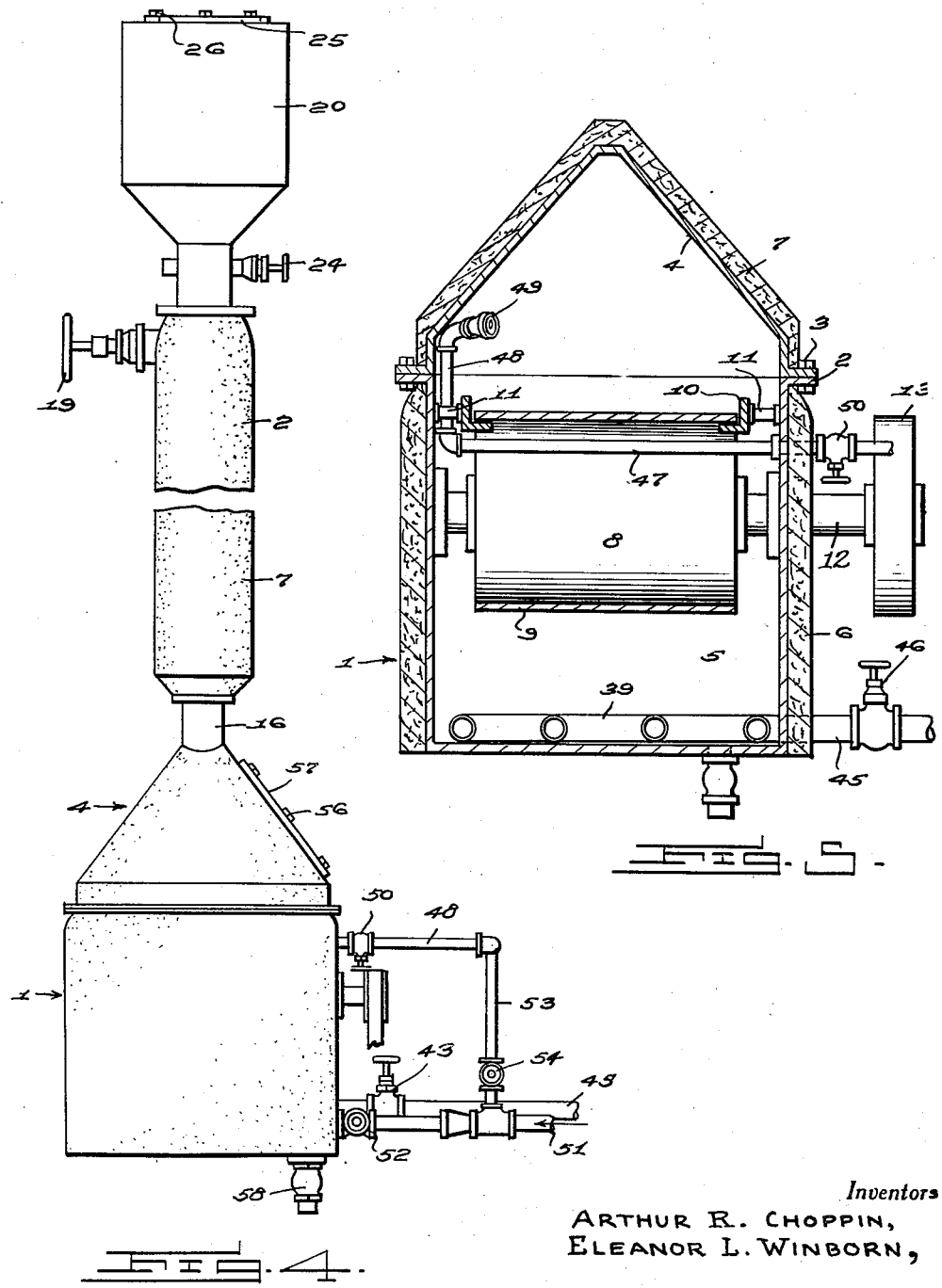
Inventors
ARTHUR R. CHOPPIN,
ELEANOR L. WINBORN,
By Clarence A. O'Brien
and Hyman Berman
Attorneys Sept. 3, 1940. A. R. CHOPPIN ET AL 2,213,623
COOKING APPARATUS
Original Filed June 7, 1939 3 Sheets-Sheet 3
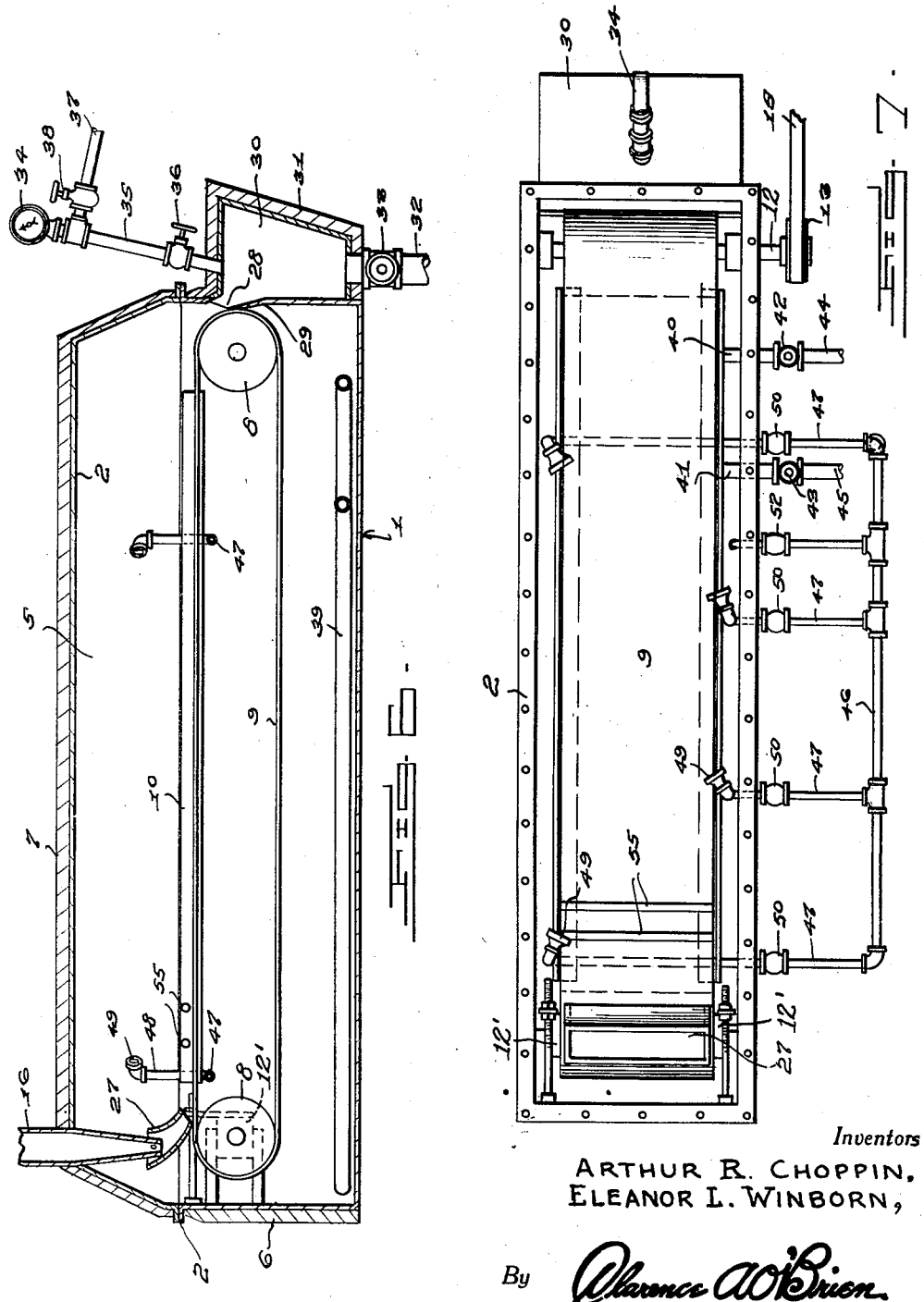
Inventors
ARTHUR R. CHOPPIN,
ELEANOR L. WINBORN,
By Clarence A. O'Brien
and Hyman Berman
Attorneys Patented Sept. 3, 1940

2,213,623

UNITED STATES PATENT OFFICE

2,213,623

COOKING APPARATUS

Arthur R. Choppin, Baton Rouge, La., and Eleanor L. Winborn, Lumberton, Miss., assignors to The Rice Millers' Association, New Orleans, La.

Original application June 7, 1939, Serial No. 277,910, now Patent No. 2,195,165, dated March 26, 1940. Divided and this application February 7, 1940, Serial No. 317,774

3 Claims. (Cl. 53—18)

Our invention relates to improvements in cooking apparatus for use more particularly in cooking rice according to the method disclosed in our co-pending application Serial No. 277,910, filed June 7, 1939, and of which the present application is a division.

The principal object of the invention is to provide practical, efficient apparatus for cooking rice so as to hydrolize the starch therein uniformly throughout the rice grains and prevent excessive hydrolysis and the consequent rupture of the external cells of the grains.

Still another object is to provide cooking apparatus for cooking rice either thoroughly or partially, as desired, and either on a large or small scale as regard to quantity cooked.

Other and subordinate objects are also comprehended by our invention all of which, together with the precise nature of our improvement, will be readily understood when the succeeding description and claims are read with reference to the drawings accompanying and forming part of this specification.

In said drawings:

Figure 1 is a view in side elevation of a preferred form of our apparatus,

Figure 2 is a fragmentary view taken on the line 2—2 of Figure 1 looking in the direction indicated by the arrows and illustrating on an enlarged scale details of the supply hopper and adjunctive parts, Figure 3 is a view in top plan of the hopper, Figure 4 is a view in end elevation of the apparatus drawn to an enlarged scale, Figure 5 is a view in transverse section taken on the line 5—5 of Figure 1 looking in the direction of the arrows, Figure 6 is a view in central longitudinal section of the apparatus illustrating the internal parts thereof, and Figure 7 is a view in top plan with the hood removed.

Referring now to the drawings by numerals, the illustrated apparatus comprises a substantially rectangular, open-top tank 1 provided with a marginal edge flange 2 around its top to which is bolted, as at 3, a similarly flanged closure hood 4 preferably somewhat dome-shaped in cross section and forming, together with the tank, a steam chamber 5. The tank 1 and hood 4 may be suitably insulated, as at 6, and 7, exteriorly to retain heat.

A pair of transverse rollers 8 are suitably journaled in the sides of the tank 1, at the opposite ends thereof, respectively, and spaced from the bottom of said tank. The rollers 8 support an endless apron conveyor 9, of any suitable material, the top stretch of which is supported at its side edges by angle iron guides 10 mounted on the sides of the tank 1, as at 11, and forming guard rails for retaining a bed of rice, not shown, on said stretch. The journal 12 of one roller 8 is extended through one side of the tank 1 and equipped with a pulley 13 fast thereon to which a suitable motor 14 is operatively connected by a belt 15. The journal of the other roller 8 is mounted in bearings 12' adjustable in any suitable manner to tighten or loosen said apron.

At one end of the hood 4 is an upstanding feed pipe 16 suitably insulated, as at 17, and surmounted by a sliding gate valve 18 of any suitable type operative by a hand wheel 19 to open and close the upper end of said pipe. A supply hopper 20 having a depending neck 22 threaded into the top of the valve 18 provides for gravity feed of a supply of rice into said feed pipe 16. A rotary valve 23 interposed in the neck 22 and operative by a hand wheel 24 provides for controlling the feed from the supply hopper 20 to the valve 18. The top of the supply hopper 20 is closed by a detachable cover plate 25 preferably bolted thereto, as at 26.

The lower end of the feed pipe 16 extends into the hood 4 and into an elongated feed chute 27 suitably mounted in the hood 4 to extend across one end of the conveyor 9 constituting the loading end thereof.

The end of the tank 1 contiguous the discharge end of the conveyor 9, which is to say, the end remote from the chute 27, is slotted opposite the adjacent roller 8 to provide a discharge aperture 28 extending across said end of the tank, and said end of the tank is bent below said aperture to form a scraper blade 29 engaging the discharge end of the conveyor 9 below the top stretch thereof for a purpose presently clear. The discharge aperture 28 opens into the upper part of a closed discharge hopper 30 forming an end extension of the tank 1 and insulated, as at 31. A discharge pipe 32 depends from the bottom of the discharge hopper 30 with a discharge control valve 33 interposed therein.

A steam pressure gauge 34 is attached to the top of the discharge hopper 30 by a pipe 35 having a cutoff valve 36 interposed therein. A pressure bleed pipe 37 extends from the pipe 35 with a bleed valve 38 therein.

A steam coil 39 is disposed flat on the bottom of the tank 1, said coil preferably extending substantially from end to end of the tank and having inlet and outlet ends 40, 41, extending through one side of the tank and provided with inlet and outlet control valves 42, 43, respectively, to which are connected inlet and discharge lines 44, 45, respectively.

Extending along one side of the tank 1 exteriorly thereof, is a water spray line 46 having lateral branches 47 extending therefrom into the tank 1 slightly below the upper stretch of the conveyor 9. The branches 47 have upstanding ends 48 disposed alongside the edges of the upper stretch of the conveyor 9 which are spaced along said stretch at suitable intervals and terminate above said stretch in spray nozzles 49 extending laterally over the edges of the stretch in the general direction of the travel of the latter. Valves 50 interposed in said branches 47 control the flow of water therethrough.

A water supply line 51 for water under pressure extends into the side of the tank 1 on which said spray line 46 is located, said supply line entering said tank adjacent the bottom thereof and having a supply control valve 52 interposed therein. A branch line 53 extends from the supply line 51 to the spray line 46 in front of the valve 52 and with a pressure control valve 54 therein.

A plurality of leveling rods 55 extend between the guides 10 across the upper stretch of the conveyor 9 adjacent to the feed hopper 27, said rods being suitably secured at their ends to said guides and located slightly above said upper stretch to cause the rice to spread out in a layer.

The sides of the hood 4 have detachably secured thereto, as by bolts 56, cover plates 57 for openings, not shown, in said hood providing for access to the chamber 5 and conveyor 9.

A drain valve 58 is provided in the bottom of the tank 1 at any desired point therein.

Referring briefly to the operation of the described apparatus. The motor 14 operates the conveyor 9 to drive the top stretch in the direction of the discharge hopper 30. Water, preferably hot, is admitted to the chamber 5 by way of water supply line 51 under control of the valve 52 to any desired level above the steam coil 39 and below conveyor 9. Steam from any suitable source is permitted to circulate through said coil 39 under control of the valves 42 and 43 until the water in the tank 1 has been heated sufficiently to generate steam in the chamber 5 at the desired pressure, as determined by the gauge 34. A measured quantity of rice is permitted to drop down the feed pipe 16 into the feed chute 27. The quantity may be measured by closing valve 18 and opening the valve 24, then reversing the position of said valves as will be clear. The rice feeds from the chute 27 onto the top stretch of the conveyor 9 and is carried thereby beneath the rods 55 to be smoothed out and leveled off thereby over said stretch in a thin layer-like mass. At selected intervals, or continuously if desired, liquid water may be sprayed down on the rice out of the nozzles 49 while it is being cooked by the steam and under selective manipulation of the valves 50 and 54. The cooked rice is fed by the conveyor 9 into the discharge hopper 30 by way of discharge aperture 28 to be withdrawn from said hopper out of the valve 33. The spray from nozzles 49 may be varied to cause the steam to form into heavy mist for accumulation, or condensation, on the rice, and the water level in the tank may be raised as desired. The valve 54 provides for cutting off the spray instantly as soon as cooking is finished.

The foregoing will, it is believed, suffice to impart a clear understanding of our invention without further explanation. Manifestly, the invention, as described, is susceptible of modification without departing from the inventive concept and right is herein reserved to such modifications as fall within the scope of the subjoined claims.

What we claim is:

1. Apparatus for cooking rice and the like comprising a closed substantially rectangular tank having a discharge aperture extending across one end thereof, a supply hopper for the rice surmounting said tank, a gravity feed pipe leading from the hopper to the top of the tank adjacent the other end of the tank, an endless conveyor in the tank above the bottom thereof and extending lengthwise from substantially one end of the tank to the other for transporting rice from said pipe to said aperture, valve means in said pipe for controlling the feed therethrough, a water feed line extending into the tank for introducing water thereinto to a level below said conveyor, a steam coil in the bottom of the tank for heating said water to generate steam in the tank, means to introduce water into said tank above said conveyor including spray nozzles for directing such water downwardly on the rice being transported, and means to operate said conveyor.

2. Apparatus for cooking rice and the like comprising a closed substantially rectangular tank having a discharge aperture extending across one end thereof, a supply hopper for the rice surmounting said tank, a gravity feed pipe leading from the hopper to the top of the tank adjacent the other end of the tank, an endless conveyor in the tank above the bottom thereof and extending lengthwise from substantially one end of the tank to the other for transporting rice from said pipe to said aperture, valve means in said pipe for controlling the feed therethrough, a water feed line extending into the tank for introducing water thereinto to a level below said conveyor, a steam coil in the bottom of the tank for heating said water to generate steam in the tank, means to introduce water into said tank above said conveyor including spray nozzles for directing such water downwardly on the rice being transported, means to operate said conveyor, a closed discharge hopper at the slotted end of the tank with which said discharge aperture communicates, and a discharge control valve in the bottom of said discharge hopper.

3. Apparatus for cooking rice and the like comprising a closed substantially rectangular tank having a discharge aperture extending across one end thereof, a supply hopper for the rice surmounting said tank, a gravity feed pipe leading from said hopper to the top of the tank adjacent the other end of the tank, an endless conveyor in the tank above the bottom thereof and extending lengthwise from substantially one end of the tank to the other for transporting rice from said pipe to said aperture, valve means in said pipe for controlling the feed therethrough, a water feed line extending into the tank for introducing water thereinto to a level below said conveyor, a steam coil in the bottom of the tank for heating said water to generate steam in the tank, means to introduce water into said tank above said conveyor including spray nozzles for directing such water downwardly on the rice being transported, means to operate said conveyor, a closed discharge hopper at the slotted end of the tank with which said discharge aperture communicates, a discharge control valve in the bottom of said discharge hopper, and means to discharge steam from said tank at will to lower the steam pressure therein.

ARTHUR R. CHOPPIN.
ELEANOR L. WINBORN.